United States Patent [19]

Miernik

[11] Patent Number: 5,627,971
[45] Date of Patent: May 6, 1997

[54] MACHINE METHOD FOR DETERMINING THE ELIGIBILITY OF LINKS IN A NETWORK

[75] Inventor: Jerzy W. Miernik, Ottawa, Canada

[73] Assignee: Northern Telecom Limited, Montreal, Canada

[21] Appl. No.: 457,640

[22] Filed: Jun. 1, 1995

[51] Int. Cl.⁶ .................................................. G06F 15/16
[52] U.S. Cl. .................. 395/200.15; 364/222.2; 364/242.94; 364/284; 364/284.4; 364/DIG. 1; 370/238; 370/258
[58] Field of Search ............ 395/200.11, 200.15; 370/60, 94.3

[56] References Cited

U.S. PATENT DOCUMENTS

| | | | |
|---|---|---|---|
| 4,873,517 | 10/1989 | Baratz et al. | 340/825.03 |
| 4,987,536 | 1/1991 | Humblet | 395/200.15 |
| 5,233,604 | 8/1993 | Ahmadi et al. | 370/60 |
| 5,293,377 | 3/1994 | Gould | 370/94.1 |
| 5,521,910 | 5/1996 | Mathews | 370/54 |
| 5,546,542 | 8/1996 | Cosares et al. | 395/200.21 |

*Primary Examiner*—Kevin J. Teska
*Assistant Examiner*—Ayni Mohame
*Attorney, Agent, or Firm*—J. E. Moorhouse; George MacGregor

[57] ABSTRACT

The eligibility of all bidirectional links interconnecting a plurality of nodes in a network is determined based on the free bandwidths in both directions of the links and the bandwidth required for transmitting messages between a source node and a destination node in the network. The determination is exercised as to both ends of a link. Then, the link is determined whether or not it is eligible to become part of the shortest route. The determined eligibility of the links may provide a rapid shortest route selection, which will be executed later, because the route selection steps are not executed for ineligible links.

5 Claims, 11 Drawing Sheets eligible from the source;
eligible from the destination,
local eligibility = bidirectional adjusted eligibility = bidirectional eligible from the destination;
eligible from the source,
local eligibility = bidirectional adjusted eligibility = bidirectional source 
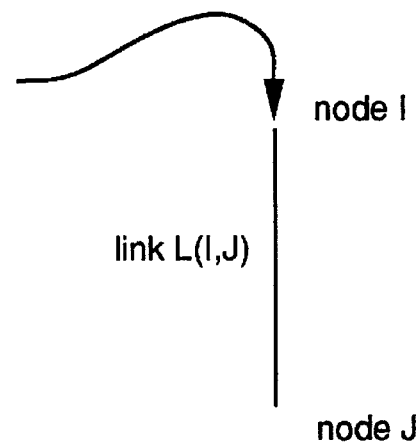
FIG. 2A
source 
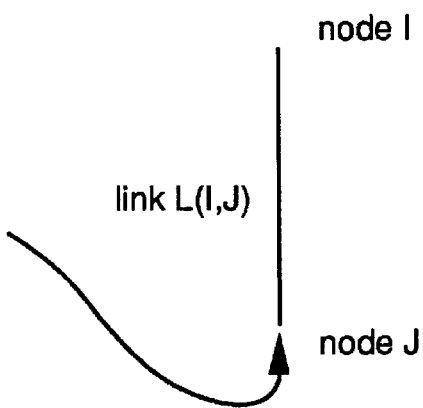
FIG. 2B

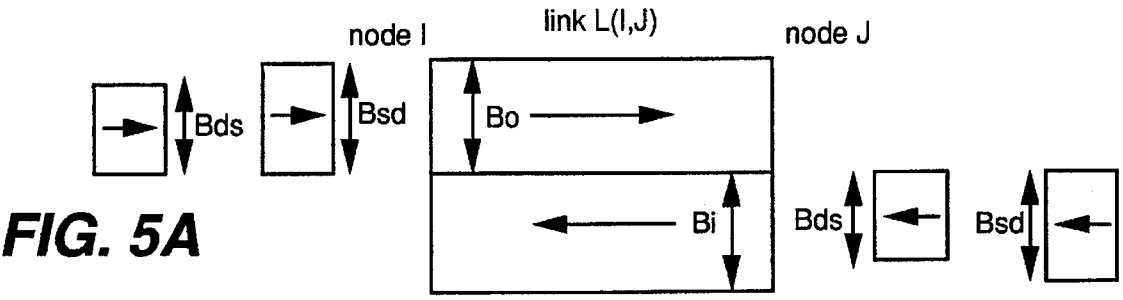

FIG. 5A eligible from the source;
eligible from the destination,
local eligibility = bidirectional eligible from the destination;
eligible from the source,
local eligibility = bidirectional adjusted eligibility = bidirectional adjusted eligibility = bidirectional

FIG. 5B eligible from the source;
eligible from the destination,
local eligibility = bidirectional eligible from the destination;
ineligible from the source,
local eligibility = unidirectional (destination)

adjusted eligibility = unidirectional (source)  adjusted eligibility = unidirectional (destination)

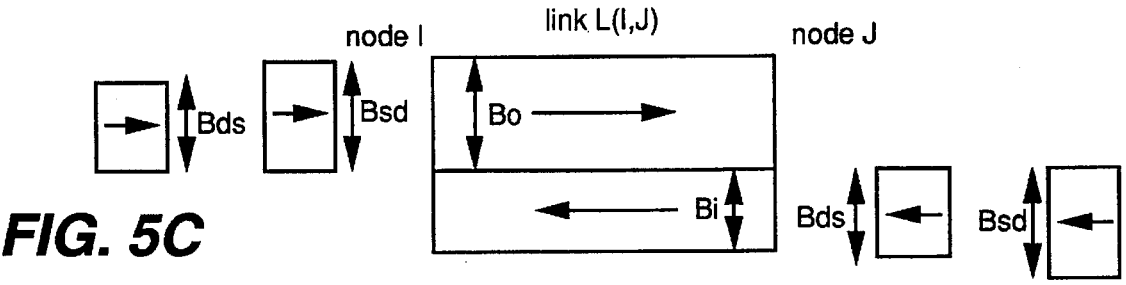

FIG. 5C eligible from the source;
eligible from the destination,
local eligibility = bidirectional ineligible from the destination;
ineligible from the source,
local eligibility = nondirectional adjusted eligibility = nondirectional adjusted eligibility = nondirectional

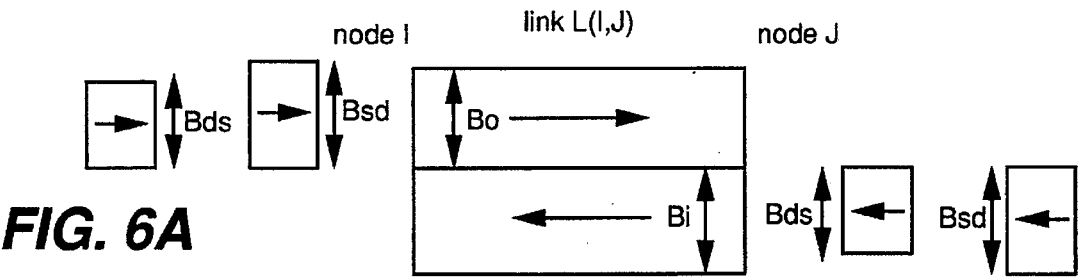

FIG. 6A ineligible from the source;
eligible from the destination,
local eligibility = unidirectional (destination)

eligible from the destination;
eligible from the source,
local eligibility = bidirectional adjusted eligibility = unidirectional (destination)  adjusted eligibility = unidirectional (source)

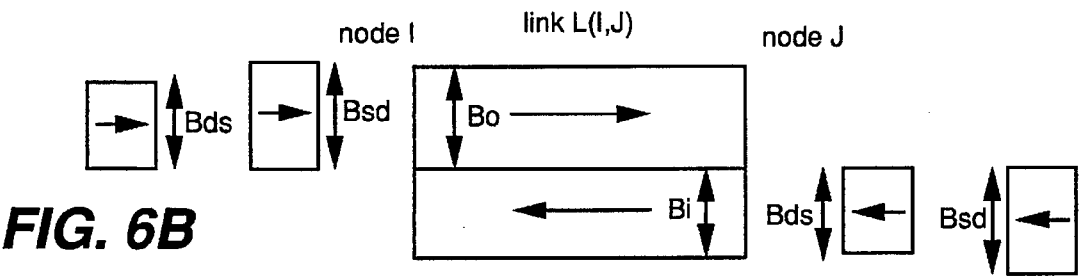

FIG. 6B ineligible from the source;
eligible from the destination,
local eligibility = unidirectional (destination)

eligible from the destination;
ineligible from the source,
local eligibility = unidirectional (destination)

adjusted eligibility = nondirectional adjusted eligibility = nondirectional

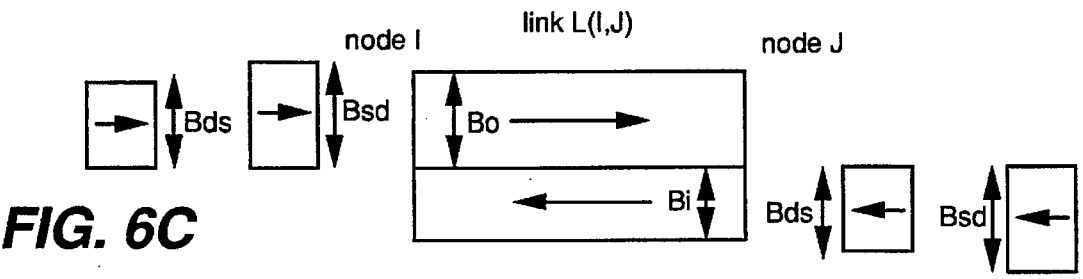

FIG. 6C ineligible from the source;
eligible from the destination,
local eligibility = unidirectional (destination)

ineligible from the destination;
ineligible from the source,
local eligibility = nondirectional adjusted eligibility = nondirectional adjusted eligibility = nondirectional

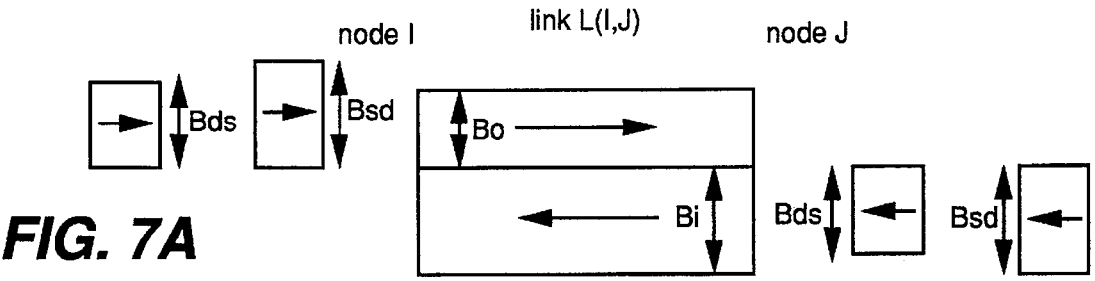

FIG. 7A ineligible from the source;
ineligible from the destination,
local eligibility = nondirectional adjusted eligibility = nondirectional eligible from the destination;
eligible from the source,
local eligibility = bidirectional adjusted eligibility = nondirectional

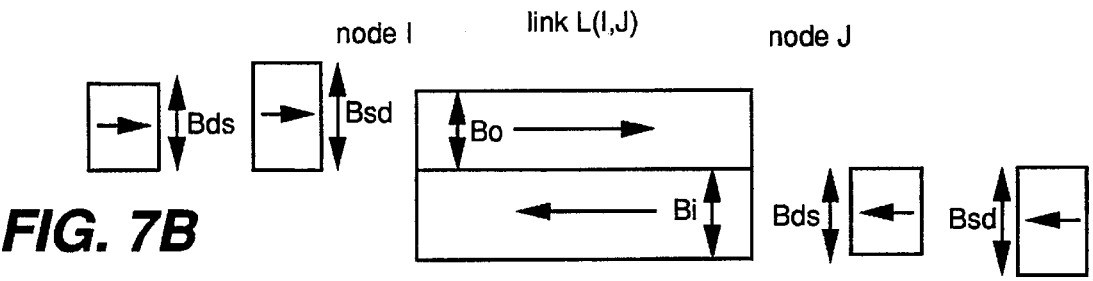

FIG. 7B ineligible from the source;
ineligible from the destination,
local eligibility = nondirectional adjusted eligibility = nondirectional eligible from the destination;
ineligible from the source,
local eligibility = unidirectional (destination)

adjusted eligibility = nondirectional

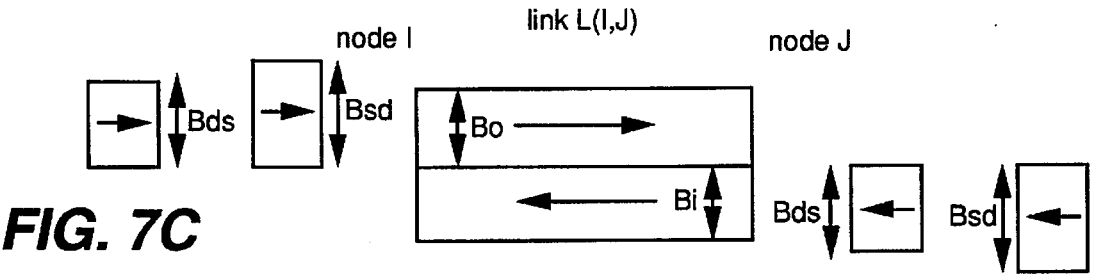

FIG. 7C ineligible from the source;
ineligible from the destination,
local eligibility = nondirectional adjusted eligibility = nondirectional ineligible from the destination;
ineligible from the source,
local eligibility = nondirectional adjusted eligibility = nondirectional

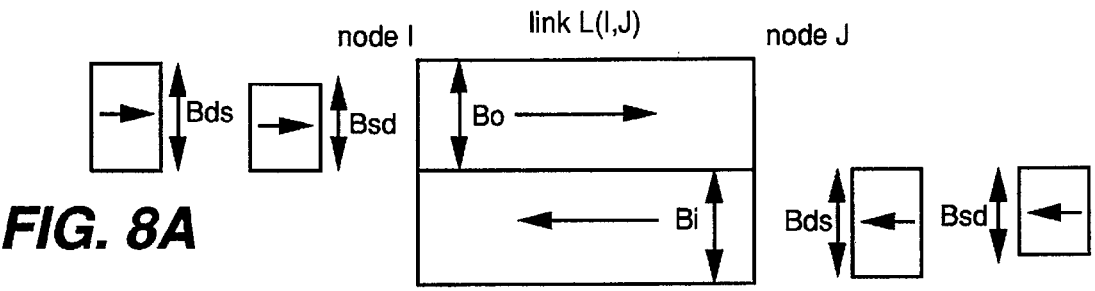

FIG. 8A eligible from the source;
eligible from the destination,
local eligibility = bidirectional eligible from the destination;
eligible from the source,
local eligibility = bidirectional adjusted eligibility = bidirectional adjusted eligibility = bidirectional

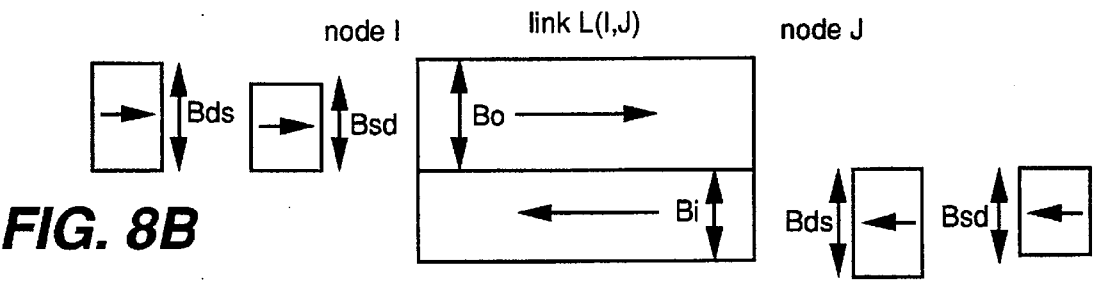

FIG. 8B eligible from the source;
eligible from the destination,
local eligibility = bidirectional ineligible from the destination;
eligible from the source,
local eligibility = unidirectional (source)

adjusted eligibility = unidirectional (destination)  adjusted eligibility = unidirectional (source)

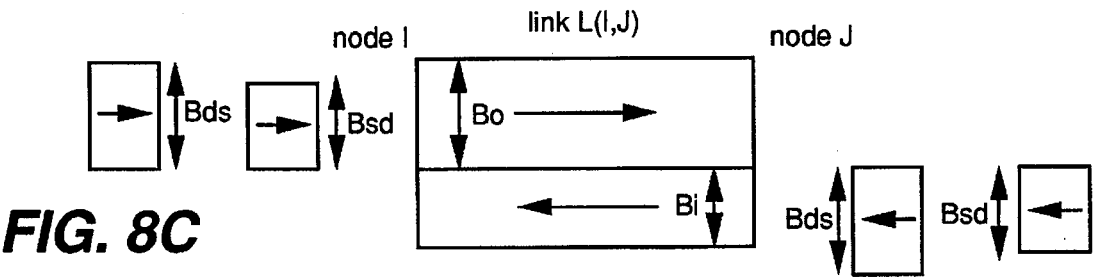

FIG. 8C eligible from the source;
eligible from the destination,
local eligibility = bidirectional ineligible from the destination;
ineligible from the source,
local eligibility = nondirectional adjusted eligibility = nondirectional adjusted eligibility = nondirectional

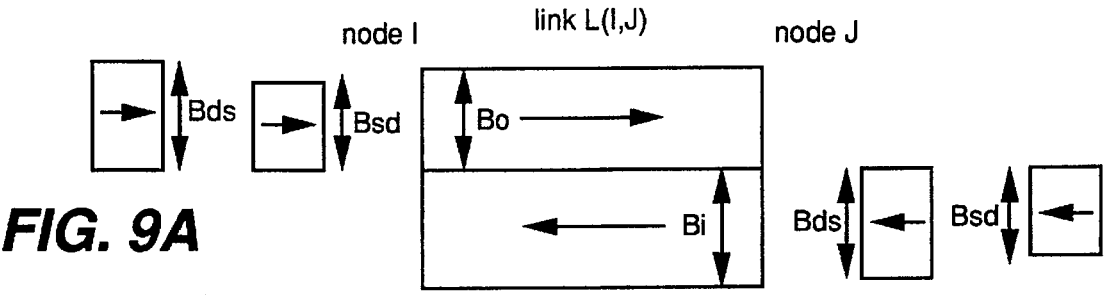

FIG. 9A eligible from the source; ineligible from the destination, local eligibility = unidirectional (source)

eligible from the destination; eligible from the source, local eligibility = bidirectional adjusted eligibility = unidirectional (source)    adjusted eligibility = unidirectional (destination)

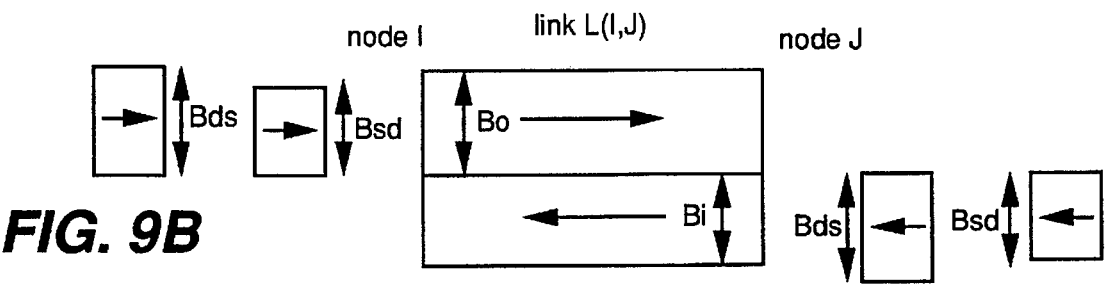

FIG. 9B eligible from the source; ineligible from the destination, local eligibility = unidirectional (source)

ineligible from the destination; eligible from the source, local eligibility = unidirectional (source)

adjusted eligibility = nondirectional adjusted eligibility = nondirectional

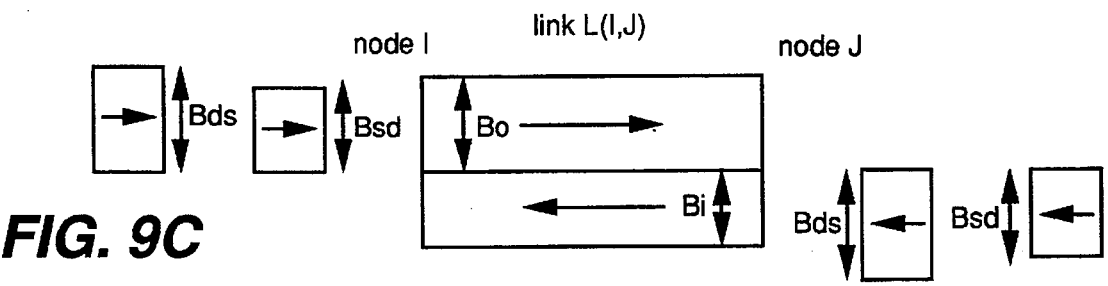

FIG. 9C eligible from the source; ineligible from the destination, local eligibility = unidirectional (source)

ineligible from the destination; ineligible from the source, local eligibility = nondirectional adjusted eligibility = nondirectional adjusted eligibility = nondirectional

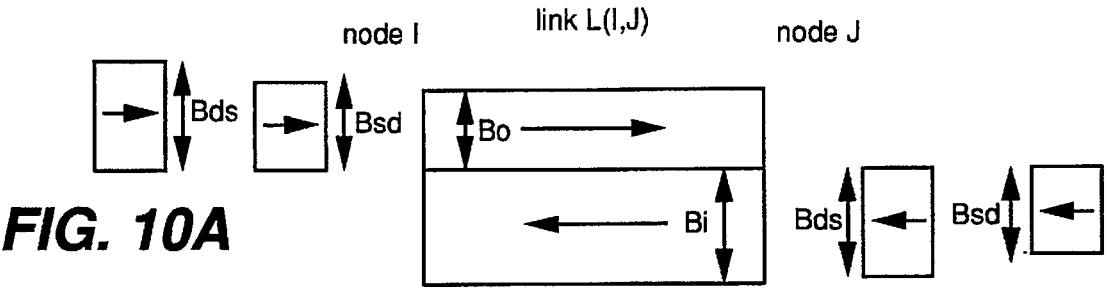

FIG. 10A ineligible from the source;
ineligible from the destination,
local eligibility = nondirectional adjusted eligibility = nondirectional eligible from the destination;
eligible from the source,
local eligibility = bidirectional adjusted eligibility = nondirectional

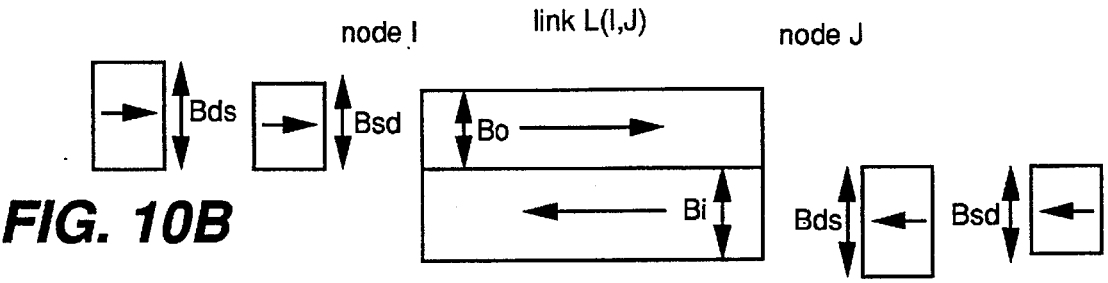

FIG. 10B ineligible from the source;
ineligible from the destination,
local eligibility = nondirectional adjusted eligibility = nondirectional ineligible from the destination;
eligible from the source,
local eligibility = unidirectional (source)

adjusted eligibility = nondirectional

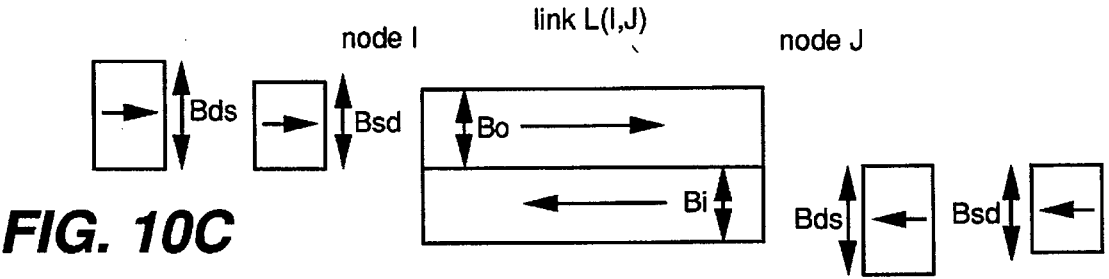

FIG. 10C ineligible from the source;
ineligible from the destination,
local eligibility = nondirectional adjusted eligibility = nondirectional ineligible from the destination;
ineligible from the source,
local eligibility = nondirectional adjusted eligibility = nondirectional

MACHINE METHOD FOR DETERMINING THE ELIGIBILITY OF LINKS IN A NETWORK

TECHNICAL FIELD

The present invention relates to a machine method for determining the eligibility of bidirectional links connecting nodes in a network, the method being used for establishing the shortest route between a pair of nodes in the network.

BACKGROUND ART

A typical telecommunications network has a number of switching nodes interconnected by transmission trunks (bidirectional links) which carry the communication signals. While the physical length of each link will generally remain fixed, other operating parameters can vary. For instance, traffic on the network will vary with time and can readily affect operating costs, accessibility, and delay times encountered in any one link of the network. It is desirable, therefore, to dynamically select the shortest route (e.g., least cost, shortest time delay etc.) between any two nodes in the network, to optimize network usage.

The determination of the shortest route is described in copending U.S. patent application Ser. No. 08/170,073 filed on Dec. 16, 1993 by the same applicant (now abandoned).

SUMMARY OF THE INVENTION

It is an object of the present invention to provide a method for determining the eligibility and/or ineligibility of bidirectional links in a network, the method being performed prior to a method for determining the shortest route between two end nodes. The method of the present invention is particularly useful if performed in combination with the method disclosed in U.S. patent application Ser. No. 08/170,073 now abandoned.

According to one aspect of the present invention, there is provided a machine method for determining the eligibility of each of a plurality of bidirectional links to be a potential route available for selection as a shortest route for transmitting messages between a source node and a destination node selected from a plurality of nodes in a network, the nodes being interconnected via the bidirectional links, each link having a free communication bandwidth in each of outbound and inbound directions. The machine method comprises the steps of: (I) determining the eligibility of both link ends of the link, by comparing the outbound and inbound bandwidths of the link with the bandwidths required for the source-destination direction and for the destination-source direction, the eligibility being bidirectional, source-unidirectional, destination-unidirectional or nondirectional; and II) determining the eligibility of the link, on the basis of the eligibility of the link ends determined at step (I), whether or not the link can become part of the shortest route.

On the basis of the determination results of both link ends of the link, for example, the eligibility of the link is determined as follows:

(i) in the case where both link ends are bidirectional, the link is eligible to become part of the shortest route;

(ii) in the case where either link end is nondirectional, the link is not eligible to become part of the shortest route in either direction;

(iii) in the case where both link ends are source-unidirectional or destination-unidirectional, the link is not eligible to become part of the shortest route in either direction;

(iv) in the case where one link end is source-unidirectional and the other link end is bidirectional, the link is eligible to become part of the shortest route if one link end is closer to the source node and the other link end is closer to the destination node;

(v) in the case where one link end is bidirectional and the other link end is source-unidirectional, the link is eligible to become part of the shortest route if one link end is closer to the destination node and the other link end is closer to the source node;

(vi) in the case where one link end is bidirectional and the other link end is destination-unidirectional, the link is eligible to become part of the shortest route if one link end is closer to the source node and the other link end is closer to the destination node; and (vii) in the case where one link end is destination-unidirectional and the other link end is bidirectional, the link is eligible to become part of the shortest route if one link end is closer to the destination node and the other link end is closer to the source node.

According to another aspect of the present invention, there is provided a machine method for determining the eligibility of each of bidirectional links to select a shortest route for transmitting messages between a source node and a destination node selected from a plurality of nodes in a network, the nodes being interconnected via the bidirectional links, each link having a free communication bandwidth in each of outbound and inbound directions.

The machine method comprises the steps of:

(A) testing, regarding one link end of the link, whether the outbound bandwidth is smaller than the bandwidth required for the source-destination direction;

(B) testing, regarding one link end, whether the outbound bandwidth is smaller than the bandwidth required for the destination-source direction;

(C) testing, regarding the other link end of the link, whether the inbound bandwidth is smaller than the bandwidth required for the destination-source direction;

(D) testing, regarding the other link end, whether the inbound bandwidth is smaller than the bandwidth required for the source-destination direction; and (E) determining, on the basis of the test results, the eligibility of the link whether or not the link can become part of the shortest route in the network.

For example, step (E) comprises the steps of determining as follows:

(a) in the case where all steps (A), (B), (C) and (D) test false, the link is eligible to become part of the shortest route;

(b) in a case where any one of: (i) steps (A) and (B) test true; (ii) steps (C) and (D) test true; (iii) steps (A) and (D) test true; and (iv) steps (B) and (C) test true, the link is not eligible to become part of the shortest route;

(c) in a case where any one of: (i) steps (B) and (D) test true; (ii) step (B) tests true; and (iii) step (D) tests true, the link is eligible to become part of the shortest route if one link end is closer to the source node and the other link end is closer to the destination node; and (d) in a case where any one of: (i) steps (A) and (C) test true; (ii) step (A) tests true; and (iii) step (C) tests true, the link is eligible to become part of the shortest route if one link end is closer to the destination node and the other link end is closer to the source node.

The determined eligibility of the links may provide a rapid shortest route selection, because the route selection steps are not executed for ineligible links.

3

BRIEF DESCRIPTION OF THE DRAWINGS

An example embodiment of the present invention will be described with reference to the accompanying drawings in which:

FIGS. 2A and 2B illustrate the use of a link in both directions from the source node;

FIGS. 5A, 5B and 5C illustrate the local and adjusted eligibility of both ends of the link;

FIGS. 6A, 6B and 6C illustrate the local and adjusted eligibility of both ends of the link;

FIGS. 7A, 7B and 7C illustrate the local and adjusted eligibility of both ends of the link;

FIGS. 8A, 8B and 8C illustrate the local and adjusted eligibility of both ends of the link;

FIGS. 9A, 9B and 9C illustrate the local and adjusted eligibility of both ends of the link;

FIGS. 10A, 10B and 10C illustrate the local and adjusted eligibility of both ends of the link.

DETAILED DESCRIPTION

Figure 1:
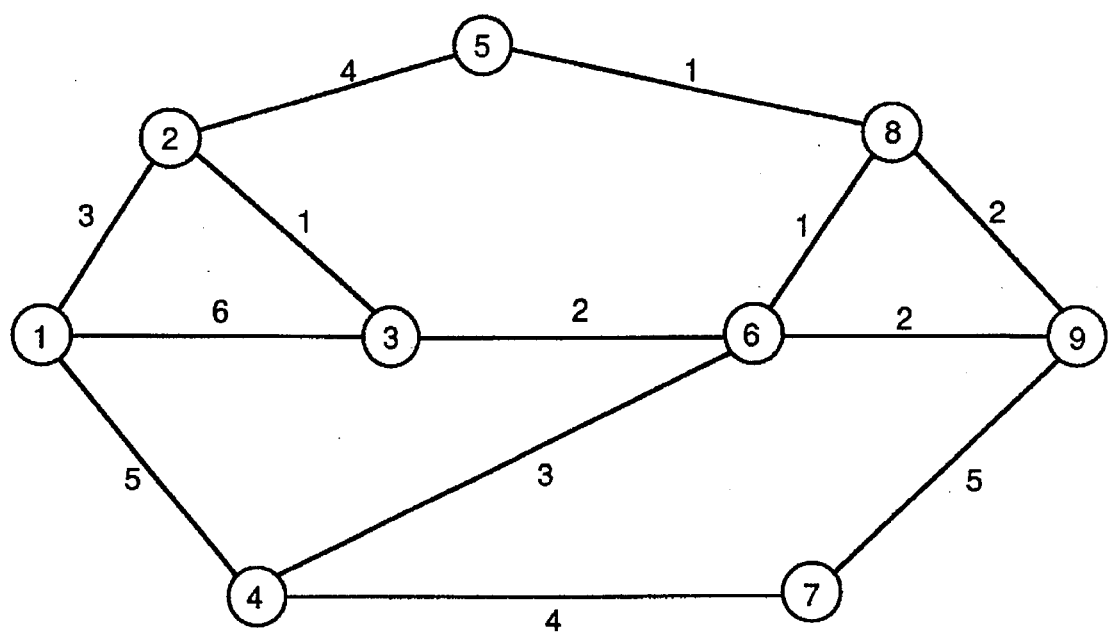
FIG. 1 is a schematic representation of a telecommunications network having a plurality of nodes which are interconnected via bidirectional links.

FIG. 1 illustrates a telecommunications network comprising a plurality of switching centers, as represented by nodes 1 to 9 (enclosed in circles), each with its own unique identity. Nodes 1 to 9 are interconnected by communication trunks, represented by bidirectional links, each having a given length (ranging from 1 to 6 in the example) which can vary over time with such operating parameters as the initial and instantaneous operating expense, the queue (time delay) of information packets awaiting transmission or any combination of these and other parameters. When establishing a route between two end nodes, it is desirable to utilize the least expensive or shortest route to optimize network utilization. In this example embodiment, the source node 1 and the destination node 9 are the selected end nodes.

Figure 3A:
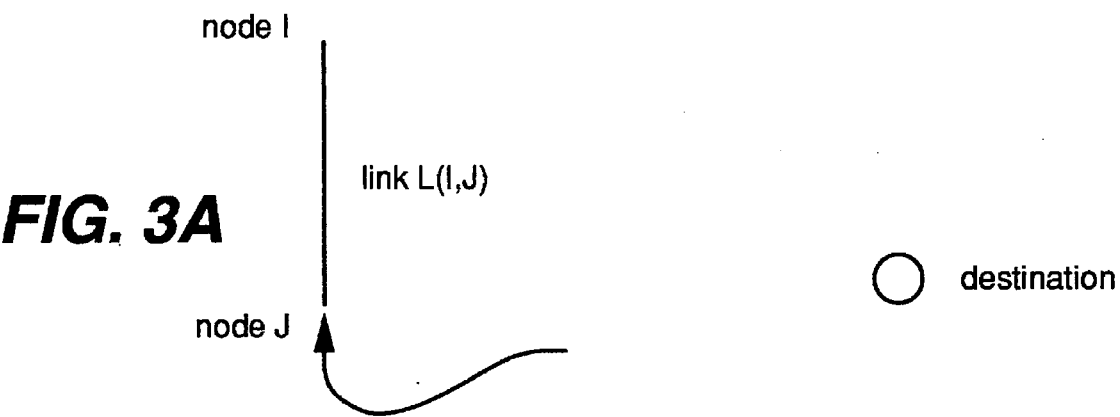
FIGS. 3A and 3B illustrate the use of a link in both directions from the destination node.
Figure 3B:
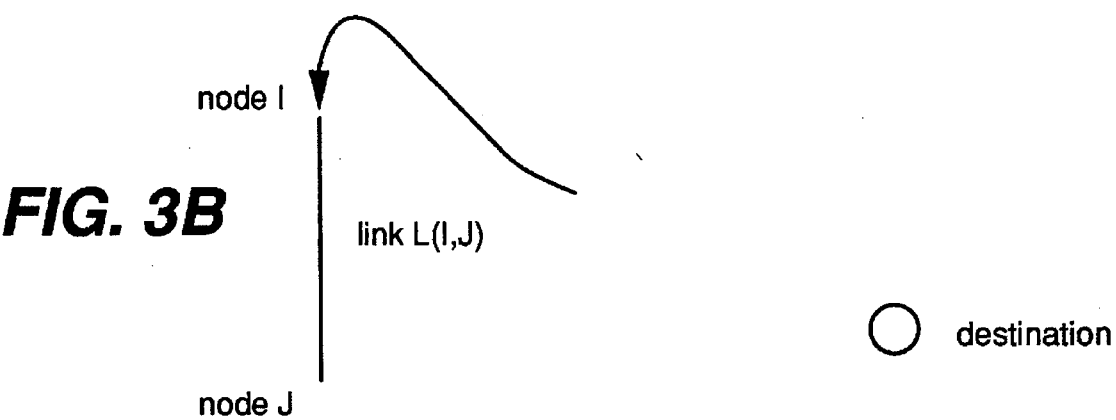

Each of the bidirectional links may be used for a route, if it has sufficient bandwidths. Assume a link L(I,J) interconnects node I and node J. The link may be used in either one of the two directions, as is shown in FIGS. 2A, 2B, 3A and 3B; and FIG. 2A shows that one link end at node I is closer to the source node and FIG. 2B shows that the other link end at node J is closer to the source node. FIG. 3A shows that the link end at node J is closer to the destination node and FIG. 3B shows that the link end at node I is closer to the destination node. (The directions of link usage explained here are identical to directions of route selection as explained in co-pending U.S. patent application Ser. No. 08/170,073 filed on Dec. 16, 1993 (now abandoned).)

Figure 4A:
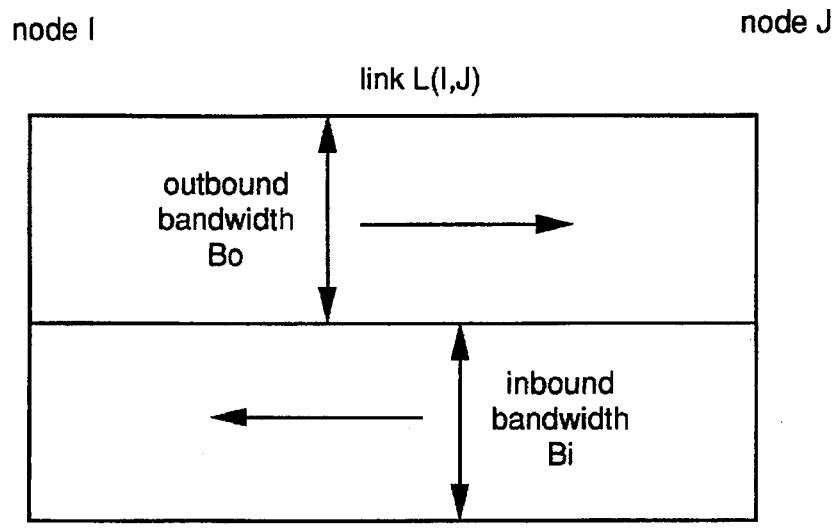
FIGS. 4A, 4B and 4C illustrate the bandwidths of the link and required for transmitting messages.

Each link L(I,J) has a free communication bandwidth in each direction. As shown in FIG. 4A, with reference to node I, the link L(I,J) has an outbound bandwidth Bo in the direction of transmission from node I to node J and an inbound bandwidth Bi in the direction of transmission from node J to node I. The outbound and inbound bandwidths Bo and Bi of each link may be different from each other. The information of the length LEN(I,J) and the outbound and inbound bandwidths Bo and Bi of the links L(I,J) is updated, prior to the determination of the eligibility of the link ends and the shortest route in the network.

Figure 4B:
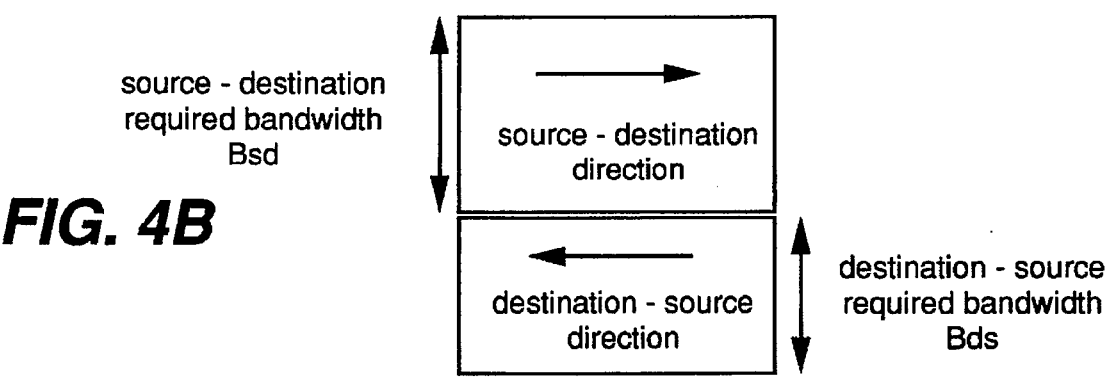
Figure 4C:
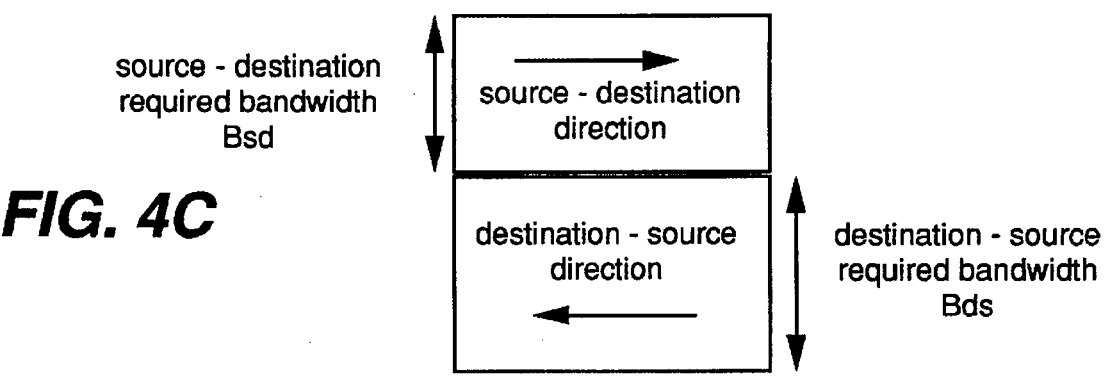

In order to transmit messages between the source node 1 between the destination node 9, the bandwidths required for direction from the source to the destination and for the direction from the destination to the source may be different, as shown in FIGS. 4B and 4C. In FIG. 4B, the bandwidth Bsd for the source-destination direction is greater than the bandwidth Bds for the destination-source direction. FIG. 4C, the bandwidth Bds for the destination-source direction is greater than the bandwidth Bsd for the source-destination direction.

The eligibility of each of the links will now be described. With reference to node I, a given link L(I,J) is interconnected between node I and node J which is adjacent to node I. Hereinafter, a "local eligibility" characterizes capability of a link end of a bidirectional link in question to transmit messages through the link in a given direction, and a "global eligibility" characterizes capability of a bidirectional link in question to become part of the shortest route in the network to transmit messages between the source and destination nodes.

I. Case of Bsd>Bds

Referring to FIGS. 5A–C, 6A–C and 7A–C, the eligibility of links is described in a case where the bandwidth Bsd for the source-destination direction is greater than the bandwidth Bds for the destination-source direction.

FIG. 5A:

Regarding the link end at node I, the source-destination required bandwidth Bsd is smaller than or equal to the outbound bandwidth Bo of the link and the destination-source required bandwidth Bds is smaller than or equal to the outbound bandwidth Bo of the link. The local eligibility of the link end at node I is bidirectional. Regarding the link end at node J, the destination-source required bandwidth Bds is smaller than or equal to the inbound bandwidth Bi of the link and the source-destination required bandwidth Bsd is smaller than or equal to the inbound bandwidth Bi of the link. The local eligibility of the link end at node J is bidirectional. Because the local eligibility of both ends is bidirectional, the eligibility of the node I and J ends is not necessarily adjusted. Hence, each end of the link can be used closer to either the source or the destination for the shortest route for transmitting messages between the source and destination nodes. The global eligibility of the link L(I,I) is bidirectional.

FIG. 5B:

Regarding the link end at node I, the local eligibility of the link end at node I is bidirectional, as is shown in FIG. 5 (a). Regarding the link end at node J, the destination-source required bandwidth Bds is smaller than or equal to the inbound bandwidth Bi of the link and the source-destination required bandwidth Bsd is greater than the inbound bandwidth Bi of the link. The local eligibility of the link end at node J is unidirectional from the destination only. Because, while the node I end is bidirectional, the node J end is destination-unidirectional, the eligibility of the node I and J ends must be adjusted to "from source" and "from destination", respectively. Hence, the node I end of the link can be used closer to only the source and the node J end can be used closer to only the destination for the shortest route for transmitting messages between the source and destination nodes. The global eligibility of the link L(I,J) is source-destination unidirectional.

FIG. 5C:

Regarding the link end at node I, the local eligibility of the link end at node I is bidirectional, as is shown in FIG. 5A.

Regarding the link end at node J, the destination-source required bandwidth Bds is greater than the inbound bandwidth Bi of the link and the source-destination required bandwidth Bsd is greater than the inbound bandwidth Bi of the link. The local eligibility of the link end at node J is nondirectional. Because, while the node I end is bidirectional, the node J end is nondirectional, the global eligibility of the node I and J ends must be adjusted to "nondirectional". Hence, both ends of the link cannot be used for the shortest route for transmitting messages. The global eligibility of the link L(I,J) is nondirectional.

FIG. 6A:

Regarding the link end at node I, the source-destination required bandwidth Bsd is greater than the outbound bandwidth Bo of the link and the destination-source required bandwidth Bds is smaller than or equal to the outbound bandwidth Bo of the link. The local eligibility of the link end at node I is unidirectional from the destination only. Regarding the link end at node J, both the destination-source required bandwidth Bds and the source-destination required bandwidth Bsd are smaller than or equal to the inbound bandwidth Bi of the link. The local eligibility of the link end at node J is bidirectional. Because, while the node J end is bidirectional, the node I end is destination-unidirectional, the eligibility of the node I and J ends must be adjusted to "from destination" and "from source", respectively. Hence, the node I end of the link can be used closer to only the destination and the node J end can be used closer to only the source for the shortest route for transmitting messages between the source and destination nodes. The global eligibility of the link L(I,J) is destination-source unidirectional.

FIG. 6B:

Regarding the link end at node I, the local eligibility of the link end at node I is unidirectional from the destination, as is shown in FIG. 6A. Regarding the link end at node J, the destination-source required bandwidth Bds is smaller or equal to the inbound bandwidth Bi of the link and the source-destination required bandwidth Bsd is greater than the inbound bandwidth Bi of the link. The local eligibility of the link end at node J is unidirectional from the destination. Because the node I and J ends are eligible from the destination only, the eligibility of the node I and J ends must be adjusted to "nondirectional". Hence, both ends of the link cannot be used for the shortest route for transmitting messages. The global eligibility of the link L(I,J) is nondirectional.

FIG. 6C:

Regarding the link end at node I, the local eligibility of the link end at node I is unidirectional from the destination, as is shown in FIG. 6A. Regarding the link end at node J, both the destination-source required bandwidth Bds and the source-destination required bandwidth Bsd are greater than the inbound bandwidth Bi of the link. The local eligibility of the link end at node J is nondirectional. Because, while the node I end is destination-unidirectional, the node J end is nondirectional, the eligibility of the node I and J ends must be adjusted to "nondirectional". Hence, both ends of the link cannot be used for the shortest route for transmitting messages. The global eligibility of the link L(I,J) is nondirectional.

FIG. 7A:

Regarding the link end at node I, both the source-destination required bandwidth Bsd and the destination-source required bandwidth Bds are greater than the outbound bandwidth Bo of the link. The local eligibility of the link end at node I is nondirectional. Regarding the link end at node J, both the destination-source required bandwidth Bds and the source-destination required bandwidth Bsd are smaller than or equal to the inbound bandwidth Bi of the link. The local eligibility of the link end at node J is bidirectional. Because, while the node J end is bidirectional, the node I end is nondirectional, the eligibility of the node I and J ends must be adjusted to "nondirectional". Hence, both ends of the link cannot be used for the shortest route for transmitting messages between the source and destination ends. The global eligibility of the link L(I,J) is nondirectional.

FIG. 7B:

Regarding the link end at node I, the local eligibility of the link end at node I is nondirectional, as is shown in FIG. 7A. Regarding the link end at node J, the destination-source required bandwidth Bds is smaller than or equal to the inbound bandwidth Bi of the link and the source-destination required bandwidth Bsd is greater than the inbound bandwidth Bi of the link. The local eligibility of the link end at node J is unidirectional from the destination. Because, while the node J end is destination-unidirectional, the node I end is nondirectional, the eligibility of the node I and J ends must be adjusted to "nondirectional". Hence, both ends of the link cannot be used for the shortest route for transmitting messages. The global eligibility of the link L(I,J) is nondirectional.

FIG. 7C:

Regarding the link end at node I, the local eligibility of the link end at node I is nondirectional, as is shown in FIG. 7A. Regarding the link end at node J, both the destination-source required bandwidth Bds and the source-destination required bandwidth Bsd are greater than the inbound bandwidth Bi of the link. The local eligibility of the link end at node J is nondirectional. Because, both ends of the link are nondirectional, the eligibility of "nondirectional" at both link ends is not necessarily adjusted. Hence, both ends of the link cannot be used for the shortest route for transmitting messages. The global eligibility of the link L(I,J) is nondirectional.

II. Case of Bds>Bsd

Referring to FIGS. 8A–C, 9A–C and 10A–C, the eligibility of links is described in a case where the bandwidth Bds for the destination-source direction is greater than the bandwidth Bsd for the source-destination direction.

FIG. 8A:

Regarding the link end at node I, both the source-destination required bandwidth Bsd and the destination-source required bandwidth Bds are smaller than or equal to the outbound bandwidth Bo of the link. The local eligibility of the link end at node I is bidirectional. Regarding the link end at node J, both the destination-source required bandwidth Bds and the source-destination required bandwidth Bsd are smaller than or equal to the inbound bandwidth Bi of the link. The local eligibility of the link end at node J is bidirectional. Because the node I and J ends are bidirectional, the eligibility of the node I and J ends J is not necessarily adjusted. Hence, each end of the link can be used closer to either the source or the destination for the shortest route for transmitting messages between the source and destination nodes. The global eligibility of the link L(I,J) is bidirectional.

FIG. 8B:

Regarding the link end at node I, the local eligibility of the link end at node I is bidirectional, as is shown in FIG. 8A. Regarding the link end at node J, the destination-source required bandwidth Bds is greater than the inbound bandwidth Bi of the link and the source-destination required bandwidth Bsd is smaller than or equal to the inbound bandwidth Bi of the link. The local eligibility of the link end at node J is unidirectional from the source. Because, while the node I end is bidirectional, the node J end is source-unidirectional, the eligibility of the node I and J ends must be adjusted to "from destination" and "from source", respectively. Hence, the node I end of the link can be used closer to only the destination and the node J end can be used closer to only the source for the shortest route for transmitting messages between the source and destination nodes. The global eligibility of the link L(I,J) is destination-source unidirectional.

FIG. 8C:

Regarding the link end at node I, the local eligibility of the link end at node I is bidirectional, as is shown in FIG. 8A. Regarding the link end at node J, both the destination-source required bandwidth Bds and the source-destination required bandwidth Bsd are greater than the inbound bandwidth Bi of the link. The local eligibility of the link end at node J is nondirectional. Because, while the node I end is bidirectional, the node J end is nondirectional, the eligibility of the node I and J ends must be adjusted to "nondirectional". Hence, both ends of the link cannot be used for the shortest route for transmitting messages. The global eligibility of the link L(I,J) is nondirectional.

FIG. 9A:

Regarding the link end at node I, the source-destination required bandwidth Bsd is smaller than or equal to the outbound bandwidth Bo of the link and the destination-source required bandwidth Bds is greater than the outbound bandwidth Bo of the link. The local eligibility of the link end at node I is unidirectional from the source. Regarding the link end at node J, both the destination-source required bandwidth Bds and the source-destination required bandwidth Bsd are smaller than or equal to the inbound bandwidth Bi of the link. The local eligibility of the link end at node J is bidirectional. Because, while the node J end is bidirectional, the node I end is source-unidirectional, the eligibility of the node I and J ends must be adjusted to "from source" and "from destination", respectively. Hence, the node I end of the link can be used closer to only the source and the node J end can be used closer to only the destination for the shortest route for transmitting messages between the source and destination nodes. The global eligibility of the link L(I,J) is source-destination unidirectional.

FIG. 9B:

Regarding the link end at node I, the local eligibility of the link end at node I is unidirectional from the source, as is shown in FIG. 9A. Regarding the link end at node J, the destination-source required bandwidth Bds is greater than the inbound bandwidth Bi of the link and the source-destination required bandwidth Bsd is smaller than or equal to the inbound bandwidth Bi of the link. The local eligibility of the link end at node J is unidirectional from the source. Because, both ends at nodes I and J of the link are eligible from the source only, the eligibility of the node I and J ends must be adjusted to "nondirectional". Hence, both ends of the link cannot be used for the shortest route for transmitting messages. The global eligibility of the link L(I,J) is nondirectional.

FIG. 9C:

Regarding the link end at node I, the local eligibility of the link end at node I is unidirectional from the source, as is shown in FIG. 9A. Regarding the link end at node J, both the destination-source required bandwidth Bds and the source-destination required bandwidth Bsd are greater than the inbound bandwidth Bi of the link. The local eligibility of the link end at node J is nondirectional. Because, while the node I end is source-unidirectional, the node J end is nondirectional, the eligibility of the node I and J ends must be adjusted to "nondirectional". Hence, both ends of the link cannot be used for the shortest route for transmitting messages. The global eligibility of the link L(I,J) is nondirectional.

FIG. 10A:

Regarding the link end at node I, both the source-destination required bandwidth Bsd and the destination-source required bandwidth Bds are greater than the outbound bandwidth Bo of the link. The local eligibility of the link end at node I is nondirectional. Regarding the link end at node J, both the destination-source required bandwidth Bds and the source-destination required bandwidth Bsd are smaller than or equal to the inbound bandwidth Bi of the link. The local eligibility of the link end at node J is bidirectional. Because, while the node J end is bidirectional, the node I end is nondirectional, the eligibility of the node I and J ends must be adjusted to "nondirectional". Hence, both ends of the link cannot be used for the shortest route for transmitting messages. The global eligibility of the link L(I,J) is nondirectional.

FIG. 10B:

Regarding the link end at node I, the local eligibility of the link end at node I is nondirectional, as is shown in FIG. 10A. Regarding the link end at node J, the destination-source required bandwidth Bds is greater than the inbound bandwidth Bi of the link and the source-destination required bandwidth Bsd is smaller than or equal to the inbound bandwidth Bi of the link. The local eligibility of the link end at node J is unidirectional from the source. Because, while the node J end is source-unidirectional, the node I end is nondirectional, the eligibility of the node I and J ends must be adjusted to "nondirectional". Hence, both ends of the link cannot be used for the shortest route for transmitting messages. The global eligibility of the link L(I,J) is nondirectional.

FIG. 10C:

Regarding the link end at node I, the local eligibility of the link end at node I is nondirectional, as is shown in FIG. 10A. Regarding the link end at node J, both the destination-source required bandwidth Bds and the source-destination required bandwidth Bsd are greater than the inbound bandwidth Bi of the link. The local eligibility of the link end at node J is nondirectional. Because both ends of the link are nondirectional, the eligibility of "nondirectional" at both link ends is not necessarily adjusted. Hence, both ends of the link cannot be used for the shortest route for transmitting messages. The global eligibility of the link L(I,J) is nondirectional.

Attached Table I shows the local eligibility of the links and their adjusted eligibility.

Figure 11:
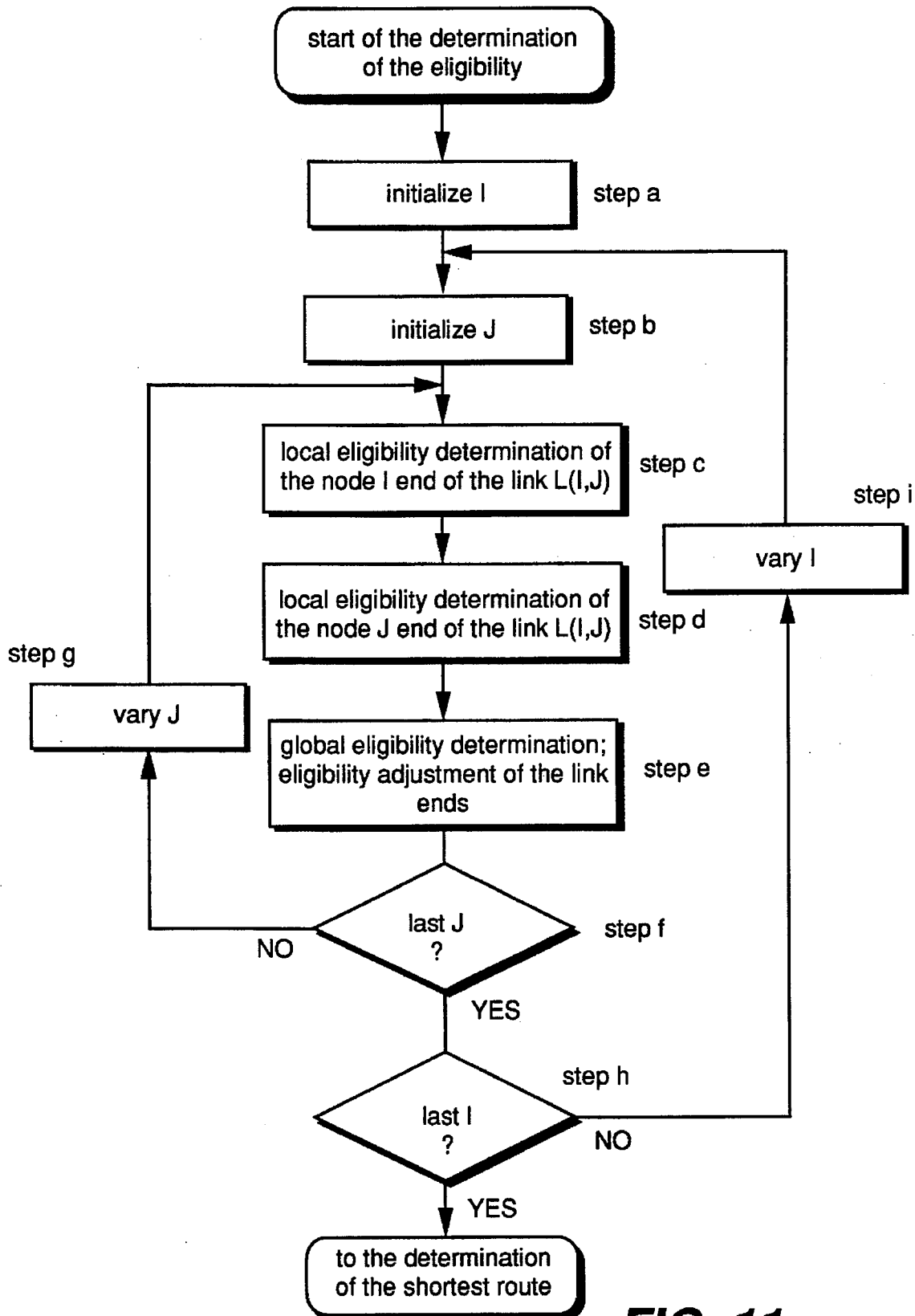
FIG. 11 is a flow chart of the algorithm used to determine the eligibility of the bidirectional links in the network.

Referring to FIG. 11, the steps for determining the eligibility of the links will now be described.

Initially, information on the current operating state (length of the links L(I,J) and operating state of the nodes) is conveyed over conventional control channels from each of the nodes 1 to 9, to every other node, or to a control center (not shown). Therefore, information of the length LEN(I,J) of each link L(I,J) and the free communication bandwidths Bo and Bi in both directions for each of the links L(I,J) is updated.

Assume in the present case the source node is node 1. A route selection subsystem at node 1 performs to determine the eligibility of the links in the network. The eligibility of each link is determined, based on the updated free bandwidth of that link and the source-destination required bandwidth Bsd and the destination-source required bandwidth Bds.

Step a:

The subsystem at node 1 initializes a first node parameter I. The parameter I identifies one of the nodes in the network.

Step b:

A second node parameter J is initialized. The parameter J identifies one of the nodes connected via the links to node I in the network.

Step c:

Regarding node I, the local eligibility of the node I end of the link L(I,J) is determined. The determination is exercised by the following steps:

(A) Whether the outbound bandwidth Bo of the link L(I,J) is smaller than the source-destination required bandwidth Bsd is tested.

(B) Whether the outbound bandwidth Bo of the link L(I,J) is smaller than the destination-source required bandwidth Bds is tested.

(C) The eligibility of the link end at node I is determined. In the case where both steps (A) and (B) test true, the link end at node I is nondirectional (see FIGS 7A–C and 10A–C). In the case where both steps (A) and (B) test false, the link end at node I is bidirectional (see FIGS. 5A–C and 8A–C). In the case where steps (A) and (B) test false and true, respectively, the link end at node I is unidirectional from the source (see FIGS. 9A–C). In the case where steps (A) and (B) test true and false, respectively, the link end at node I is unidirectional from the destination (see FIGS. 6A–C).

The control center at node 1 marks the determination results of "nondirectional", "bidirectional", "from source" or "from destination", regarding the node I end, in the data base.

Step d:

Regarding node J, the local eligibility of the node J end of the link L(I,J) is determined. The determination is exercised by the following steps:

(A) Whether the inbound bandwidth Bi of the link L(I,J) is smaller than the destination-source required bandwidth Bds is tested.

(B) Whether the inbound bandwidth Bi of the link L(I,J) is smaller than the source-destination required bandwidth Bsd is tested.

(C) The eligibility of the link end at node J is determined. In the case where both steps (A) and (B) test true, the link end at node J is nondirectional (see FIGS. 5C, 6C, 7C, 8C, 9C and 10C). In the case where steps both (A) and (B) test false, the link end at node J is bidirectional (see FIGS. 5A, 6A, 7A, 8A, 9A and 10A). In the case where steps (A) and (B) test false and true, respectively, the link end at node J is unidirectional from the destination (see FIGS. 5B, 6B, and 7B). In the case where steps (A) and (B) test true and false, respectively, the link end at node J is unidirectional from the source (see FIGS. 8B, 9B and 10B).

The control center marks the determination results of "nondirectional", "bidirectional", "from source" or "from destination", regarding the node J end, in the data base.

Step e:

The global eligibility of the link is determined on the bases of the local eligibility determination results marked at steps c and d and the eligibility of both ends of the link is adjusted as to whether or not the link can become part of the shortest route in the network to transmit messages between the source and destination nodes.

(i) In the case where both link ends are bidirectional, the eligibility of both link ends are not changed. The global eligibility of the node I and J ends is "bidirectional" (see FIGS. 5A and 8A).

(ii) In the case where either link end is nondirectional, the eligibility of the node I and J ends is adjusted to "nondirectional" as the global eligibility (see FIGS. 5C, 6C, 7A–C, 8C, 9C and 10A–C).

(iii) In the case where both link ends at nodes I and J are unidirectional from the source, the eligibility of the node I and J nodes is changed to "nondirectional" as the global eligibility (see FIG. 9B).

(iv) In the case where both link ends at nodes I and J are unidirectional from the destination, the eligibility of the node I and J nodes is changed to "nondirectional" as the global eligibility (see FIG. 6B).

(v) In the case where the link end at node I is unidirectional from the source and the link end at node J is bidirectional, the eligibility of the node I and J ends is adjusted to "from source" and "from destination", respectively, as the global eligibility (see FIG. 9A).

(vi) In the case where the link end at node I is bidirectional and the link end at node J is unidirectional from the source, the eligibility of the node I and J ends is adjusted to "from destination" and "from source", respectively, as the global eligibility (see FIG. 6A).

(vii) In the case where the link end at node I is bidirectional and the link end at node J is unidirectional from the destination, the eligibility of the node I and J ends is adjusted to "from source" and "from destination", respectively, as the global eligibility (see FIG. 5B).

(viii) In the case where the link end at node I is unidirectional from the destination and the link end at node J is bidirectional, the eligibility of the node I and J ends is adjusted to "from destination" and "from source", respectively, as the global eligibility (see FIG. 8B).

The determination of the eligibility is already described with reference to FIGS. 5A–C, 6A–C, 7A–C, 8A–C, 9A–C and 10A–C and Table I.

The global eligibility regarding the link ends at nodes I and J is marked in the data base, by setting associated flags (i.e., "bidirectional"-"bidirectional", "nondirectional"-"nondirectional", "from source"-"from destination", or "from destination"-"from source". The associated flags marked in the data base at the source node 1 are used for the later step of a method for determining the shortest route between the source node 1 and the destination node 9.

Steps f–i:

The parameter J is tested whether it identifies the last one of the nodes interconnected to node I via the links (step f). If step f tests false, the parameter J is incremented (step g) and steps c–e are repeated. If step f tests true (i.e., the parameter J identifies the last one of the nodes), then the parameter I is tested whether it currently identifies the last one of the nodes in the network (step h). If the parameter I does not identify the last node, the parameter I is incremented (step i) and steps b–g are repeated. If step h tests true (i.e., the parameter I identifies the last node), the determination of the eligibility of the links is completed.

Upon completion of the eligibility of all links, the shortest route is determined on the basis of the associated flags marked in the data base. One example of the method for determining the shortest route is described in co-pending U.S. patent application Ser. No. 08/170,073 (now abandoned). Because, in the selection of the shortest route, only eligible link ends are examined, the route selection is rapidly made.

TABLE I

| Local Eligibility (local link end marking) | | Adjusted Eligibility (global link end marking) | |
|---|---|---|---|
| Node I End | Node J End | Node I End | Node J End |
| bidirectional | bidirectional | bidirectional | bidirectional |
| bidirectional | from dest | from source | from dest |
| bidirectional | from source | from dest | from source |
| bidirectional | nondirectional | nondirectional | nondirectional |
| from dest | bidirectional | from dest | from source |
| from dest | from dest | nondirectional | nondirectional |
| from dest | nondirectional | nondirectional | nondirectional |
| from source | bidirectional | from source | from dest |
| from source | from source | nondirectional | nondirectional |
| from source | nondirectional | nondirectional | nondirectional |
| nondirectional | bidirectional | nondirectional | nondirectional |
| nondirectional | from dest | nondirectional | nondirectional |
| nondirectional | from source | nondirectional | nondirectional |
| nondirectional | nondirectional | nondirectional | nondirectional |

What is claimed is:

1. A method for determining the eligibility of each of a plurality of bidirectional links to be a potential route available for selection as a shortest route for transmitting messages between a source node and a destination node selected from a plurality of nodes in a network, the nodes being interconnected via the bidirectional links, each link having a free communication bandwidth in each of outbound and inbound directions, said method comprising the steps of:

A) determining the eligibility of both link ends of the link, by comparing the outbound and inbound bandwidths of the link with the bandwidths required for the source-destination direction and for the destination-source direction, the eligibility being bidirectional, source-unidirectional, destination-unidirectional or nondirectional; and B) determining the eligibility of the link, on the basis of the eligibility of the link ends determined at step A), whether or not the link can become part of the shortest route, wherein step A) comprises the steps of:

(a) testing whether the outbound bandwidth is smaller than the bandwidth required for the source-destination direction;

(b) testing whether the outbound bandwidth is smaller than the bandwidth required for the destination-source direction;

(c) determining the eligibility of one link end on the basis of the test results at steps (a) and (b) as follows:
  (i) in the case where steps (a) and (b) test true, one link end is nondirectional,
  (ii) in the case where steps (a) and (b) test false, one link end is bidirectional,
  (iii) in the case where steps (a) and (b) test false and true, respectively, one link end is source-unidirectional, and
  (iv) in the case where steps (a) and (b) test true and false, respectively, one link end is destination-unidirectional; and (d) determining the eligibility of the link regarding the other link end, by comparing the inbound bandwidth with the bandwidths required for the destination-source direction and for the source-destination direction.

2. A method for determining the eligibility of each of a plurality of bidirectional links to be a potential route available for selection as a shortest route for transmitting messages between a source node and a destination node selected from a plurality of nodes in a network, the nodes being interconnected via the bidirectional links, each link having a free communication bandwidth in each of outbound and inbound directions, said method comprising the steps of:

A) determining the eligibility of both link ends of the link, by comparing the outbound and inbound bandwidths of the link with the bandwidths required for the source-destination direction and for the destination-source direction, the eligibility being bidirectional, source-unidirectional, destination-unidirectional or nondirectional; and B) determining the eligibility of the link, on the basis of the eligibility of the link ends determined at step A), whether or not the link can become part of the shortest route, wherein step A) comprises the steps of:

(a) determining the eligibility of the link regarding one link end, by comparing the outbound bandwidth with the bandwidths required for the source-destination direction and for the destination-source direction;

(b) testing whether the inbound bandwidth is smaller than the bandwidth required for the destination-source direction;

(c) testing whether the inbound bandwidth is smaller than the bandwidth required for the source-destination direction; and (d) determining the eligibility of the other link end on the basis of the test results at steps (b) and (c) as follows:
  (i) in the case where steps (b) and (c) test true, the other link end is nondirectional,
  (ii) in the case where steps (b) and (c) test false, the other link end is bidirectional,
  (iii) in the case where steps (b) and (c) test false and true, respectively, one link end is destination-unidirectional, and
  (iv) in the case where steps (b) and (c) test true and false, respectively, one link end is source-unidirectional.

3. A method for determining the eligibility of each of a plurality of bidirectional links to be a potential route available for selection as a shortest route for transmitting messages between a source node and a destination node selected from a plurality of nodes in a network, the nodes being interconnected via the bidirectional links, each link having a free communication bandwidth in each of outbound and inbound directions, said method comprising the steps of:

A) determining the eligibility of both link ends of the link, by comparing the outbound and inbound bandwidths of the link with the bandwidths required for the source-destination direction and for the destination-source direction, the eligibility being bidirectional, source-unidirectional, destination-unidirectional or nondirectional; and B) determining the eligibility of the link, on the basis of the eligibility of the link ends determined at step A), whether or not the link can become part of the shortest route, wherein step B) comprises the step of determining as follows:

(a) in the case where both link ends are bidirectional, the link is eligible to become part of the shortest route, (a) in the case where either link end is nondirectional, the link is not eligible to become part of the shortest route in either direction, (c) in the case where both link ends are source-unidirectional or destination-unidirectional, the link is not eligible to become part of the shortest route in either direction, (d) in the case where one link end is source-unidirectional and the other link end is bidirectional, the link is eligible to become part of the shortest route if one link end is closer to the source node and the other link end is closer to the destination node, (e) in the case where one link end is bidirectional and the other link end is source-unidirectional, the link is eligible to become part of the shortest route if one link end is closer to the destination node and the other link end is closer to the source node, (f) in the case where one link end is bidirectional and the other link end is destination-unidirectional, the link is eligible to become part of the shortest route if one link end is closer to the source node and the other link end is closer to the destination node, and (g) in the case where one link end is destination-unidirectional and the other link end is bidirectional, the link is eligible to become part of the shortest route if one link end is closer to the destination node and the other link end is closer to the source node.

4. The method of claim 3, further comprising the step of setting associated flags regarding one link end and the other link end of the link, the flag indicating bidirectional, nondirectional, source-unidirectional or destination-unidirectional.

5. A method for determining the eligibility of each of bidirectional links to select a shortest route for transmitting messages between a source node and a destination node selected from a plurality of nodes in a network, the nodes being interconnected via the bidirectional links, each link having a free communication bandwidth in each of outbound and inbound directions, said method comprising the steps of:

A) testing, regarding one link end of the link, whether the outbound bandwidth is smaller than the bandwidth required for the source-destination direction;

B) testing, regarding one link end, whether the outbound bandwidth is smaller than the bandwidth required for the destination-source direction;

C) testing, regarding the other link end of the link, whether the inbound bandwidth is smaller than the bandwidth required for the destination-source direction;

D) testing, regarding the other link end, whether the inbound bandwidth is smaller than the bandwidth required for the source-destination direction; and E) determining, on the basis of the test results, the eligibility of the link whether or not the link can become part of the shortest route in the network as follows:

(a) in the case where all steps A), B), C) and D) test false, the link is eligible to become part of the shortest route, (b) in a case where any one of: (i) steps A) and B) test true; (ii) steps C) and D) test true; (iii) steps A) and D) test true; and (iv) steps B) and C) test true, the link is not eligible to become part of the shortest route, (c) in a case where any one of: (i) steps B) and D) test true; (ii) step B) tests true; and (iii) step D) tests true, the link is eligible to become part of the shortest route if one link end is closer to the source node and the other link end is closer to the destination node, and (d) in a case where any one of: (i) steps A) and C) test true; (ii) step A) tests true; and (iii) step C) tests true, the link is eligible to become part of the shortest route if one link end is closer to the destination node and the other link end is closer to the source node.

* * * * *